(12) United States Patent
White et al.

(10) Patent No.: US 6,968,021 B1
(45) Date of Patent: *Nov. 22, 2005

(54) SYNCHRONIZATION METHOD AND APPARATUS FOR MODEMS BASED ON JOINTLY ITERATIVE TURBO DEMODULATION AND DECODING

(75) Inventors: Steven L. White, Cedar Rapids, IA (US); Joseph C. Whited, Marion, IA (US); Thomas L. Tapp, Cedar Rapids, IA (US); Rodney L. Mickelson, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 863 days.

This patent is subject to a terminal disclaimer.

(21) Appl. No.: 09/961,666

(22) Filed: Sep. 24, 2001

(51) Int. Cl.[7] .............................. H03D 1/00
(52) U.S. Cl. .................. 375/340; 375/343; 375/371; 375/324; 375/265; 714/799
(58) Field of Search ................ 375/265, 324, 375/236, 343, 371, 340; 714/799

(56) References Cited

U.S. PATENT DOCUMENTS

| 6,023,783 | A | 2/2000 | Divsalar et al. | |
|---|---|---|---|---|
| 6,088,387 | A | 7/2000 | Gelblum et al. | |
| 6,556,632 | B1 * | 4/2003 | Kubo et al. | 375/341 |
| 6,563,877 | B1 * | 5/2003 | Abbaszadeh | 375/242 |
| 6,621,857 | B1 * | 9/2003 | Belotserkovsky et al. | 375/149 |
| 2002/0048331 | A1 * | 4/2002 | Tran et al. | 375/341 |
| 2002/0097814 | A1 * | 7/2002 | Eidson et al. | 375/340 |
| 2002/0186793 | A1 * | 12/2002 | Kolze et al. | 375/340 |

OTHER PUBLICATIONS

"Turbo Detection of Coded Continuous-Phase Modulation" by Thomas L. Tapp and Rodney L. Mickelson, MILCOM 99, Atlantic City, NJ, Nov. 1999.

* cited by examiner

Primary Examiner—Jay K. Patel
Assistant Examiner—Guillermo Munoz
(74) Attorney, Agent, or Firm—Nathan O. Jensen; Kyle Eppele

(57) ABSTRACT

A bandwidth efficient advanced modulation waveform modem using concatenated iterative turbo coding and continuous phase modulation is disclosed. A demodulator in the modem has a turbo decoder and a decision feedback carrier and time tracking algorithm to track a carrier and adjust timing. The decision feedback carrier and time tracking algorithm may use an APP decoder as a decision device to provide symbol decisions at a high error rate and low latency for a coded input data stream. A symbol phase estimator produces a symbol phase error estimate from the symbol decisions. An erasure decision function decides which symbol decisions are correct and which symbol decisions are erasures. A carrier tracking function receives the symbol phase error estimates when the symbol decisions are correct and receives erasure inputs when the symbol decisions are erasures to maintain carrier tracking.

23 Claims, 11 Drawing Sheets

SYNCHRONIZATION METHOD AND APPARATUS FOR MODEMS BASED ON JOINTLY ITERATIVE TURBO DEMODULATION AND DECODING

GOVERNMENT RIGHTS

This invention was made with Government support under Agreement No. N00421-00-2-0316 awarded by the Naval Air Systems Command. The Government has certain rights in the invention.

BACKGROUND OF THE INVENTION

This invention relates to communications systems, data transmission, modulation and coding, turbo codes, a bandwidth efficient advanced modulation waveform, and more specifically a carrier and time tracking algorithm for use in these systems.

In digital communications systems such as cellular and PCS (personal communications systems), computer communications systems, and SATCOM (satellite communications) systems digital data is modulated by a modem onto a signal to be transmitted over a communications channel. The communications channel may add noise, interference, fading, and other corrupting influences that may result in loss of the data when demodulated at a receiver in the communications link. Channel coding has been used in communications systems for many years to detect and/or correct data bit errors by introducing redundant bits. The use of channel coding results in a reduction of data rate or an increase in required bandwidth due to the additional redundant bits.

Block codes and convolutional codes are two types of channel codes commonly used in the art of channel coding. A block code is an error detection and/or correction code in which an encoded block of data consists of n coded bits, containing k information bits (k<n) and n−k redundant check bits to detect and/or correct most errors. Types of block codes known in the art include Hamming codes, Golay code, BCH codes, and Reed Solomon codes.

Convolutional codes are widely used in the communications art to provide error correction. Convolutional codes continuously convert an entire data stream to encode the k information bits. The encoded bit stream depends on the current information bits and also on the previous input information bits. With a convolutional code, k information bits are coded into n coded bits in an encoder with m memory stages that store the state information of the encoder. A constraint length K of a convolutional code is defined as m+1 and a code rate r as k/n. The well-known Viterbi algorithm is commonly used to decode convolutional codes.

Recent advances in the art of coding to further improve error detection and correction while reducing bandwidth requirements include trellis code modulation. Trellis code modulation combines coding and modulation into one operation. By combining coding and modulation, redundancy can be obtained with no reduction in data rate or increase in bandwidth.

Continuous phase modulation (CPM) is being applied in communications due to its bandwidth efficiency and constant envelope characteristics. With CPM, the modulated signal phase transitions are smoothed. With BPSK (binary phase shift keying) a logic one is transmitted as one phase of a modulated signal and a logic zero is transmitted as a 180-degree shifted phase with a sharp transition in phase. This sharp phase transition results in broadening of the transmitted spectrum. With CPM the phase of the transmitted signal makes smooth phase changes over the bits of the modulating digital signal. An example of CPM currently in use is MSK (minimal shift keying) modulation.

Turbo codes allow reliable transmission of data across a communications channel near the theoretical limit predicted by Claude Shannon. A turbo code is generated at a transmitter by a serial or parallel concatenation of two or more component codes often recursive convolutional codes, each separated by an interleaver. For the common case of a two constituent code turbo code, turbo decoding at a receiver uses a soft decoder at the input followed by an inverse interleaver and a second soft decoder. The output of the second soft decoder feeds back to the input of the first soft decoder through an interleaver. The data is passed through the turbo decoder in several iterations with each pass improving the quality of error correction.

A new data communications waveform has been developed by Rockwell-Collins called BEAM (bandwidth efficient advanced modulation). The goal of a current application of the BEAM waveform is to increase the throughput of a typical 25-kHz UHF SATCOM channel by a factor of five over the MIL-STD-188-181A PSK (phase shift keying) waveform, while maintaining a reasonable Eb/No. The throughput would thus increase from the current standard data rate of 16 kbps to 80 kbps. The BEAM waveform must operate with current UHF satellites and thus must have a constant envelope. The constant envelope requirement is important for this application because all current UHF satellites use saturating amplifiers. In addition, most, if not all, of the UHF user terminals utilize saturating amplifiers for power efficiency. The BEAM waveform jointly combines coded CPM modulation with turbo coding. The joint combination provides superior performance over that which would have resulted by simply concatenating CPM with turbo coding. Although the BEAM waveform has been invented for UHF SATCOM applications, the BEAM waveform concept can be extended to almost any frequency band and almost any communications channel. Because of the underlying CPM modulation, it is particularly useful to those communications systems that rely on saturated amplifiers and suffer from the effects of AWGN (additive white Gaussian noise).

The recent developments in modulation and coding theory, such as turbo codes, have allowed communication capacity to move much closer to Shannon's information limit. While these developments are greatly welcomed, the issue of synchronization has received much less attention. Synchronization for modems consists of two parts. The first type of synchronization is carrier synchronization that requires that a replica of the original carrier waveform be reproduced. The second type is symbol timing synchronization that specifies where the center and thus the optimum sampling point of each symbol are located. When turbo codes are jointly combined with modern modulation methods, the large delay introduced by the turbo code interleaver/deinterleaver prevents traditional methods of decision-directed feedback from being applied to the problem of synchronization. If decision-directed feedback is used in the conventional way, the large delay causes very poor synchronization loop tracking performance.

What is needed is a method and apparatus for achieving and maintaining carrier and timing synchronization and tracking in a low signal-to-noise ratio (SNR) environment for modulation/coding systems that make use of a turbo code. The specific problem to be solved is how to obtain reliable symbol decisions and how to use those decisions in a decision-directed feedback loop.

SUMMARY OF THE INVENTION

A bandwidth efficient advanced modulation waveform modem using concatenated iterative turbo coding and continuous phase modulation and having a carrier and time tracking algorithm is disclosed. The modem has a modulator connected to a transmitter to transmit signals having coded information bits over a communications channel and a demodulator connected to a receiver to receive the signals over the communications channel. The demodulator includes a multiplier for multiplying a complex sample input signal having coded information bits and a carrier received from the receiver. A memoryless demodulator is connected to the multiplier for demodulating the multiplied complex input signal. A turbo decoder connected to the memoryless demodulator decodes the multiplied complex input signal. A carrier and time tracking loop is connected to the memoryless demodulator and the multiplier to track the input carrier and adjust time tracking.

The carrier and time tracking loop further includes a correlator bank connected to the multiplier for providing correlator phase estimates. A decision device is connected to the memoryless demodulator for delivering alpha values and hard decision phase information at a high error rate and low latency. A multiplexer is connected to the correlator bank and the decision device. The alpha values select phase estimates from the correlator bank utilizing the multiplexer. A symbol phase error estimator produces a symbol phase error estimate from the hard decision phase information and the correlator phase estimates. A carrier tracking loop filter receives the symbol phase error estimate and provides an output frequency. A numerically controlled oscillator receives the output frequency from the carrier tracking loop filter and provides a sample by sample phase output to the multiplier to multiply a next complex symbol sample to track the input carrier.

An APP decoder may be used as the decision device in the carrier and time tracking loop. The APP decoder provides a decoder metrics output confidence level and operates with a reduced traceback depth to reduce latency. An erasure decision function is used to compare the decoder metrics output confidence level from the APP decoder to a confidence threshold and the phase error estimate from the symbol phase error estimator with a phase threshold. An erasure logic function maintains knowledge of a last phase error and generates a next symbol phase error estimate. A multiplexer connected to the erasure decision function and erasure logic function passes the symbol phase error estimate when the thresholds are met and the symbol decision is accepted as correct. The multiplexer may also pass the symbol phase error estimate when the thresholds are not met but the symbol decision is accepted as correct. The multiplexer inhibits the symbol phase error estimate when the threshold is not exceeded and an erasure is declared. The erasure logic function drives the carrier tracking loop filter with a zero phase error signal, a repeat of the last phase error signal, or a decayed version of the last phase error signal when the erasure is declared.

The correlator bank includes a plurality of complex correlators. Each of the complex correlators comprises a shift register for loading complex symbol samples from the multiplier. A plurality of correlator multipliers connected to the shift register outputs compare the complex samples to correlator coefficients and a summing junction connected to the plurality of correlator multipliers sums the comparison results to give a complex correlation output.

The symbol phase estimator may be implemented as a sine-cosine mixer or an arctangent discriminator to produce a symbol phase error estimate from the phase estimate and the hard decision phase information.

The carrier and time tracking loop further comprises an inverter connected to the decision device alpha decision output to invert the alpha value, a multiplier to negate the inverted alpha value by multiplying by a minus one, and a second multiplier to multiply the inverted and negated alpha value by the symbol phase error estimate to produce a timing adjustment value.

The memoryless demodulator may be implemented as a demodulator branch metric computer that includes a plurality of branch metrics computers for computing branch metric values for a plurality of phase states and a plurality of alpha values. Each branch metric is computed as a square of an Euclidean distance between an actual symbol value and an ideal symbol corresponding to a phase state and alpha value.

The turbo decoder further comprises an inner code decoder connected to the memoryless demodulator for decoding the continuous phase shift modulation to generate probabilities for decoded information bits and new probabilities for the coded information bits. A deinterleaver is connected to the inner code decoder for reordering the decoded information bit probabilities. An outer code decoder is connected to the deinterleaver to generate probabilities for the information bits and new probability estimates for the coded bits. An interleaver is connected to the outer code decoder and the inner code decoder to reorder the new probability estimates for the coded bits and deliver the probability estimates back to the inner code decoder.

It is an object of the present invention to provide carrier and timing synchronization for a modem having iterative turbo codes and continuous phase modulation.

It is an object of the present invention to provide carrier and time tracking in a modem having large delays introduced by turbo code interleavers and deinterleavers.

It is an advantage of the present invention to obtain reliable symbol decisions in a decision-directed feedback loop and apply these decisions for carrier and/or timing recovery.

It is a feature of the present invention to provide a method for achieving and maintaining carrier and timing synchronization in a low signal to noise ratio environment for modulation/coding systems that make use of a turbo code.

BRIEF DESCRIPTION OF THE DRAWINGS

The invention may be more fully understood by reading the following description of the preferred embodiments of the invention in conjunction with the appended drawings wherein.

DETAILED DESCRIPTION

A basic iterative serially concatenated turbo code encoder implementation requires an inner code encoder and an outer code encoder separated by an interleaver that reorders input data symbols. In the BEAM (bandwidth efficient advanced modulation) implementation, the modulation is designed to act as one of the codes so therefore must have memory spanning more than one symbol. A design constraint is that the modulation must be encoder-like and perform modulator functions similar to a convolutional code encoder. CPM (continuous phase modulation) is an example of modulation with memory, as the current symbol start phase depends on past symbol phase transitions. A CPM modulator may be decomposed into a recursive convolutional encoder followed by a memory-less signal mapper. This decomposition fits the architectural needs of a BEAM SCCC (serial concatenated convolutional code) turbo codec (coder-decoder).

Figure 1:
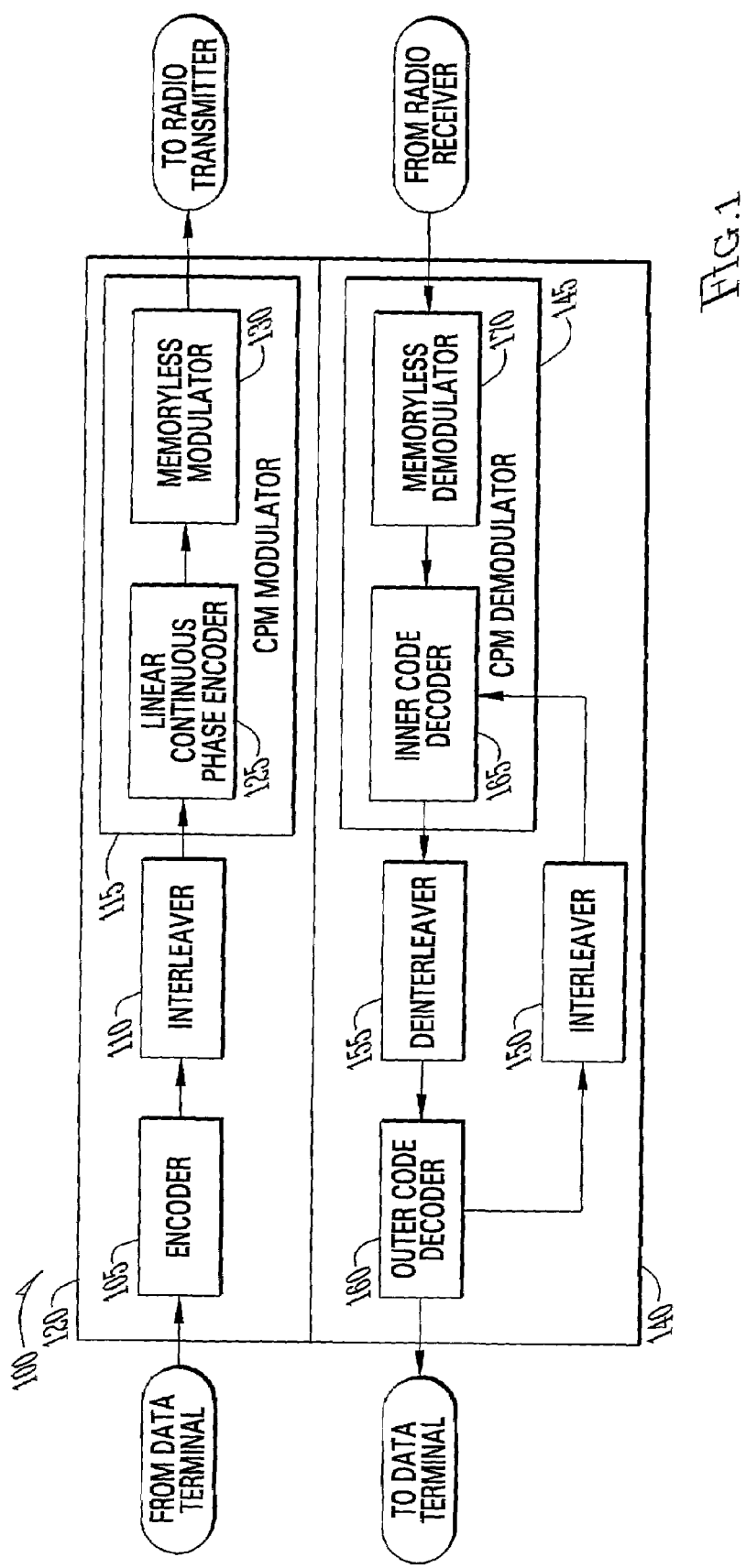
FIG. 1 is a block diagram of a bandwidth efficient advanced modulation modem with a modulator and a demodulator incorporating turbo coding and continuous phase modulation.

A BEAM modem 100 shown in FIG. 1 connected to a data terminal (not shown) comprises a BEAM coder or modulator 120 connected to a radio transmitter (not shown) and a decoder 140 connected to a radio receiver (not shown). The BEAM modulator 120 includes an outer convolutional code encoder 105 connected to a non-structured interleaver 110 and a continuous-phase modulator 115. The concatenation of the convolutional code and the CPM modulator 115 is treated as a serially concatenated turbo code, where the memory of the continuous-phase modulator 115 is the inner code. FIG. 1 shows how the CPM modulator 115 may comprise a recursive encoder 125 and a memoryless modulator 130.

In FIG. 1, the receiver decoder 140 comprises a CPM demodulator 145, a deinterleaver 155, an outer convolutional code decoder 160, and an interleaver 150. Two soft-input, soft-output a posteriori probability (APP) algorithms, also called MAP (maximum a posteriori) or BCJR (Bahl Cocke Jelinek Raviv) algorithms are implemented in a CPM demodulator 145 and the outer code convolutional code decoder 160. The CPM demodulator 145 comprises a memoryless demodulator 170 and the APP algorithm in an inner code decoder 165. The CPM APP algorithm in the CPM demodulator 145 is based on the same trellis one would use for maximum-likelihood sequence detection, only applying the APP algorithm rather than the Viterbi algorithm. The Viterbi algorithm is a maximum likelihood algorithm that finds a most probable transmitted information sequence. The Viterbi algorithm is a hard decision algorithm that can be modified into a soft output Viterbi algorithm (SOVA). The APP algorithm, more complex than the Viterbi algorithm, finds the probability that an information bit was transmitted given the coded sequence. The APP algorithm performs forward and reverse path metric calculations through a block symbol trellis. The APP algorithm is a soft-input soft-output (SISO) function well suited for iterative turbo code applications where the soft output of one decoder provides a soft input to another decoder.

In FIG. 1 on the first iteration of the decoder 140, the CPM APP algorithm in the CPM demodulator 145 receives coded information bits from the BEAM modulator 120 over a communications link and calculates probability values for the received coded information bits. After an appropriate reordering in a deinterleaver 155, these probabilities are used by the code APP algorithm in the outer code decoder 160 to generate probabilities for the information bits and new probability estimates for the coded bits. The ratios of the newly calculated probabilities to those provided by the inner decoder (commonly called the extrinsic values) for the coded bits are then reordered in an interleaver 150 and delivered back to the CPM APP algorithm in the CPM demodulator 145. The CPM APP algorithm, using these new probabilities as an a priori distribution, refines its estimates of the probabilities of the coded bits. The ratios of these new probabilities to those provided by the outer code decoder 160 (the CPM demodulator's extrinsic values) are in turn re-ordered and passed to the outer code decoder 160. In practice, it is often advantageous to calculate the log of the probability values rather than the actual probabilities. An APP algorithm operating on the log of the probability values is required to approximate the nonlinear function in $(e^{1/2}+e^{1/2})$, the simplest of which is $\max(x_1, x_2)$. This procedure continues iteratively, in effect joining the CPM demodulator 145 and the outer code decoder 160, to work at a significantly lower SNR than conventional separately decoded and demodulated CPM waveforms, or even the former state-of-the-art trellis-code CPM waveforms.

One of the primary design rules for serially concatenated turbo codes is that the inner code be recursive. If this is the case, then the system can achieve interleaver gain, meaning that the SNR requirements decrease as the interleaver length increases. The high performance of the BEAM waveform is possible because the memory of a CPM waveform can be modeled as a recursive code.

The following paragraphs describe typical design tradeoffs for the BEAM waveform used in the present invention. The tradeoffs discussed and the chosen waveform parameters are optimum for meeting the requirements for transmitting 80-kbps data over a 25-kHz SATCOM communications channel in accordance with MIL-STD-188-181B. Other parameters may be chosen for other requirements without departing from the spirit and scope of the present invention.

A desired objective with the BEAM waveform is to avoid the use of channel equalization. Channel equalization is useful for mitigating the effect of inter symbol interference (ISI) but its implementation greatly increases demodulator 140 complexity. There are also open theoretical questions about how to implement such an adaptive equalizer. For example, adaptive equalizers are usually decision-directed. However, the interleaving delay imposed by the turbo codec structure appears to prevent the output of the turbo decoder from being used to supply symbol decisions for a feedback loop. For these reasons, it is desirable to avoid using equalizers.

A primary decision point in the development of the BEAM waveform is whether to use a single-h or multi-h modulation, where h is the modulation index. Increasing the number of modulation indices increases modem complexity but may provide improved BER (bit error rate) performance due to the increased distance between merging decoder trellis paths. Multi-h CPM is not necessary, however, in an iterative decoded system to provide excellent performance. Multi-h modulation also greatly increases the number of states in the decoder trellises, thus increasing complexity. Since turbo coding is already being jointly combined with CPM in the BEAM waveform, the demodulator is already quite complex. As a side benefit to using single-h modulation, the need for superbaud synchronization is eliminated although a waveform preamble may be used to support this if ever needed.

4-ary, 8-ary and 16-ary signaling densities may be considered for the BEAM waveform. These are reasonable choices that allow the desired 80-kbps throughput in the allocated bandwidth. To select the optimum signaling density, several relevant references are available in the literature. These references show that for each single-h modulation index, there is an optimum signaling density. The optimality criterion is minimization of bandwidth versus power. In the BEAM waveform, 8-ary signaling density is chosen in order to achieve the target data rate of 80 kbps.

Smaller modulation index values provide better spectral containment but cause poorer BER performance as the number of possible phase states increases and the separation between those phase states decreases. As before, the optimality criterion is bandwidth versus power. For the selected 8-ary signaling and the desired bandwidth efficiency, the optimum modulation index is approximately ⅛.

Pulse shaping provides for various degrees of phase transition smoothing between symbols. This can lead to better spectral containment. Considered are 1-REC (rectangular or no shaping with a duration of one symbol) and 1-RC (raised cosine shaping with a duration of one symbol). Also considered is a modified 2-RC raised cosine shaping with a duration of two symbols at the modulator while using 1-REC or a modified 1-RC shaping at the demodulator.

Pulse shaping spread over more than one symbol (conventionally called partial-response signaling) induces intersymbol interference (ISI). Pulse shaping confined to one symbol duration is called full-response signaling. To fully take advantage of partial-response signaling, a more complex trellis is required. This leads to increased demodulator 140 complexity. In order to minimize complexity, the trellis structure for a modified full-response pulse shape may be substituted. This, however, incurs a substantial penalty in performance from its suboptimum nature. A smoothed full-response pulse shape, such as 1-RC, has lower spectral sidelobes, at the expense of a widened main lobe. The 1-REC pulse shape is sufficient to meet the adjacent channel interference requirements of MIL-STD-188-181B, hence precluding the need for a smoother full-response pulse, with its wider main lobe. It can also be more difficult to maintain time tracking on shaped waveforms due to their smoother nature.

Coding rate of the outer convolutional code affects the data throughput and coding gain. There is also the issue of puncturing versus non-puncturing. Puncturing removes certain symbols from a code word to reduce code word length and increase code rate. Several different code rates may be used. For the UHF SATCOM application, rate 2/3 and rate 5/6 are chosen.

Proper interleaver size and type are important to good turbo code performance. The tradeoffs with increased interleaver size are between increased latency, increased interleaver gain in a turbo decoder to provide better BER performance, and increased memory storage requirements. The memory must store a complete interleaver block of bits and/or information before interleaving or de-interleaving. Several interleaver configurations may be used with a s-random interleaver with a length of 9996 or 1998 bits being chosen.

The number of turbo decoder iterations impacts performance and throughput. Turbo decoding is processing intensive. The tradeoff with increased iteration counts is decreased BER versus increased computational loading. The number of turbo decoder iterations chosen for the present BEAM waveform implementation is eight to ten.

A summary of typical BEAM waveform characteristics chosen to meet the spectral containment requirements of MIL-STD-188-181B is shown in the table below.

| | |
|---|---|
| Data Rates | 56 kbps to 80 kbps |
| Target Channel | 25-kHz UHF SATCOM |
| Spectral Containment | Meets MIL-STD-188-181B CPM wideband ACI requirements |
| Modulation | Single-h 1-REC CPM (CPFSK) |
| Modulation Index | 1/8 |
| Signaling Density | 8-ary |
| Pulse Shaping | 1 REC (no shaping) |
| Turbo Code Rate | 2/3 punctured and 5/6 punctured |
| Interleaver Length | 9996, 1998 |
| Interleaver Type | s-random |
| Number of Turbo Decoder Iterations | 8–10 |

Figure 2:
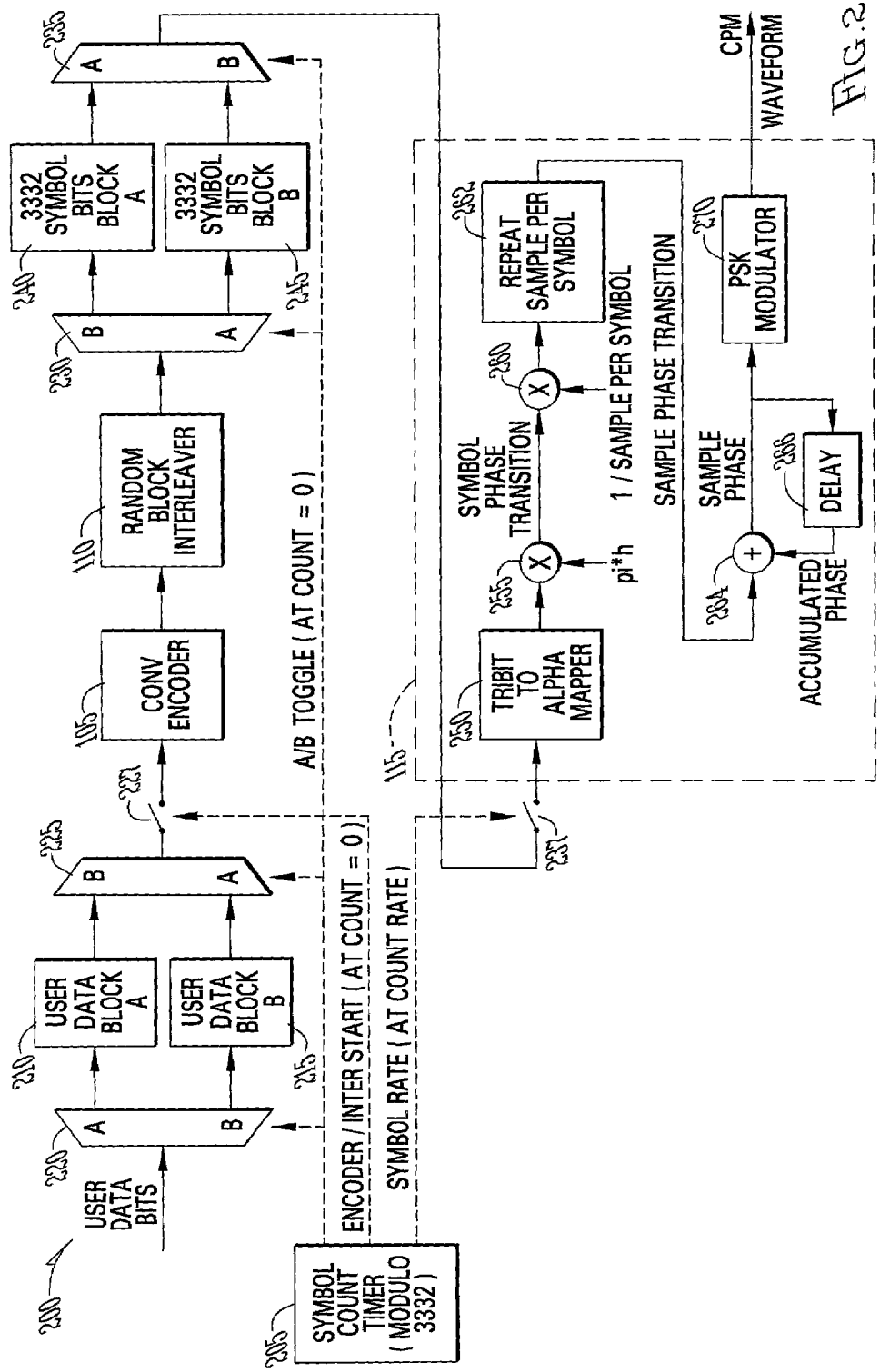
FIG. 2 is a detailed block diagram of the modulator of the modem in FIG. 1.

FIG. 2 is a block diagram of an embodiment of the BEAM modulator 120 of FIG. 1. User data bits are provided to the modulator 200 in three-bit symbols. The modulator 200 performs operations at a symbol rate and operations at a block rate where a block is 3332 or 666 symbols, for interleaver lengths 9996 or 1998, respectively. The following description is specific to the length 9996 interleaver, but it readily generalizes to other block lengths that may be used in the BEAM modem. The block-rate operations take many symbol periods to complete; therefore, double buffering between symbol-rate operations and block-rate operations is required. The functions shown in FIG. 2 may be performed in hardware blocks known in the art or implemented in software in a digital signal processor.

Assuming path A in FIG. 2, A/B toggle signal from a symbol count timer 205 sets switches 220, 225, 230 and 235 to the A position. Symbol count timer 205 in FIG. 2 provides a modulo 3332 timing signal to determine when the block is filled and then toggles the switches with the A/B toggle signal. During a previous block operation the switches 220, 225, 230, and 235 were in the B position and input user data bits at three bits per symbol were loaded into user data block B 215 as a current block of user data bits. As a next block of user data bits are input and stored to user data block A 210, the convolutional encoder 105 and the pseudo random block interleaver 110 are processing the current block of user data bits from user data block B 215 received through switch 227 under control of the symbol count modulo timer 205. A previous block of symbols in 3332 symbol bits block A 240 are passed through switch 235 to switch 237 that is opened and closed at a symbol rate under control of the symbol count timer 205 and CPM modulated in the CPM modulator 115. The block processing operations of encoding in encoder 105 and interleaving in interleaver 110, when finished, pass a current block of symbols to 3332 symbol bits block B 245 for storage. After every 3332 symbols as counted by the symbol count timer 205, the path A/B toggles.

In the implementation shown in FIG. 2, the convolutional encoder 105 may be either rate-2/3 or rate-5/6 or other rates as determined by the application. The rate-5/6 code is a punctured rate-1/2. For the rate-2/3 encoder, a block of 6662 user data bits is encoded into 9996 bits (3/2*(6662 data bits+2 flush bits)). For the rate-5/6 encoder, a block of 8328 user data bits is encoded into 9996 bits (6/5*(8328 data bits+2 flush bits)).

The block interleaver 110 may have a pseudo random interleaving pattern to minimize any structure in the output bits relative to the input bits. The block interleaver 110 may be implemented in various methods know in the art.

In the CPM 115, each 3-bit symbol (9996 bits/3=3332 symbols) is mapped to an alpha value from a group of alpha values −7, −5, −3, −1, 1, 3, 5, and 7 in a tribit-to-alpha mapper 250. For example, a data symbol of 000 may be mapped to an alpha value of 7. The tribit-to-alpha mapper 250 may be a lookup table implemented in hardware or software in a digital signal processor. The alpha value is scaled by pi*h in multiplier 255 to generate a total phase transition for the symbol (alpha*pi*h radians of phase change per symbol where h is the modulation index). The symbol phase transition is then scaled in multiplier 260 and repeated 262 to generate a sample phase transition. The sample phase transition is added 264 to the previously accumulated phase, which is stored in a delay element 266, to generate a sample phase. The sample phases are then routed to a memoryless PSK modulator 270.

Figure 3:
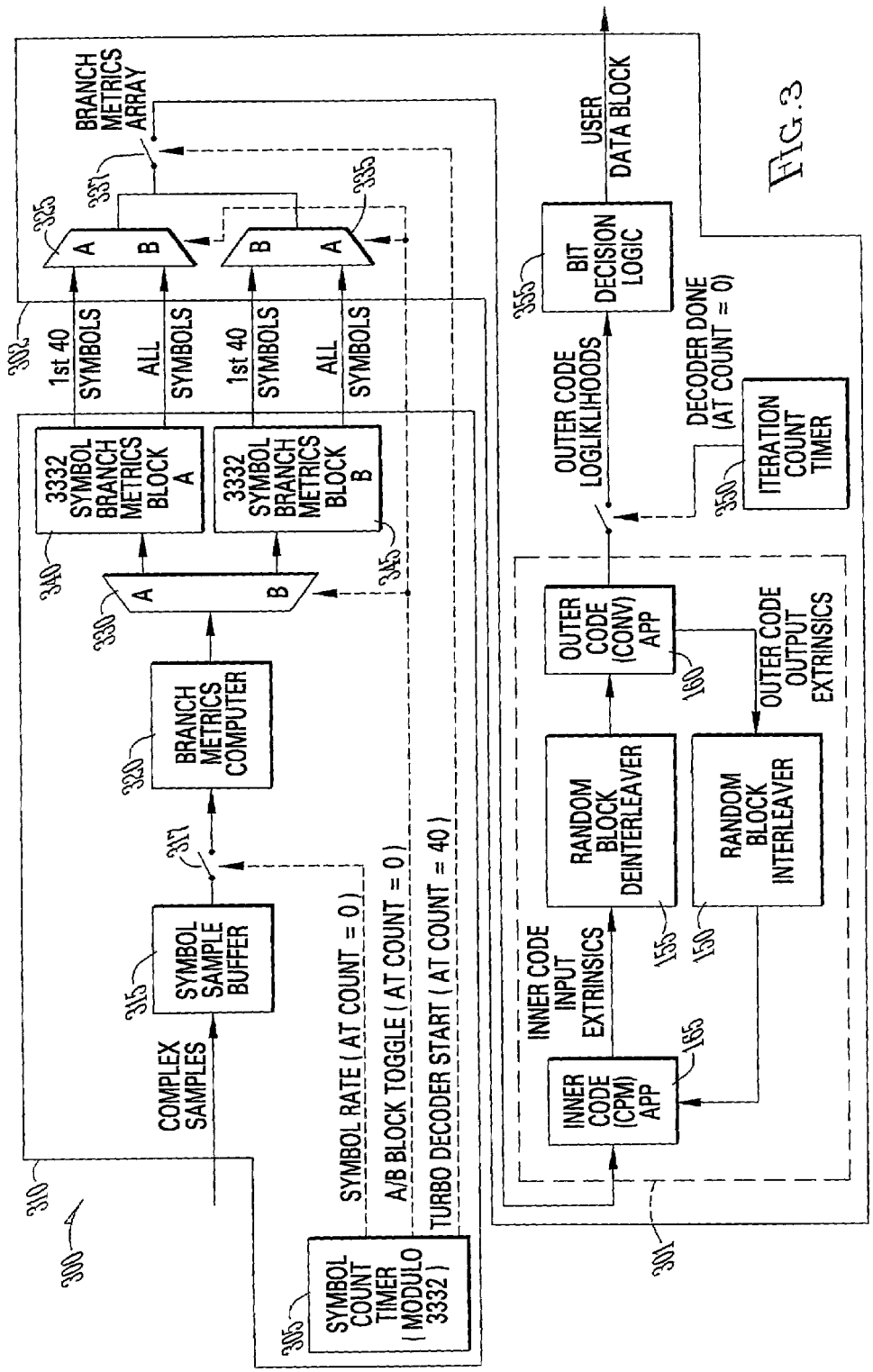
FIG. 3 is a detailed block diagram of the demodulator of the modem in FIG. 1.
Figure 4:
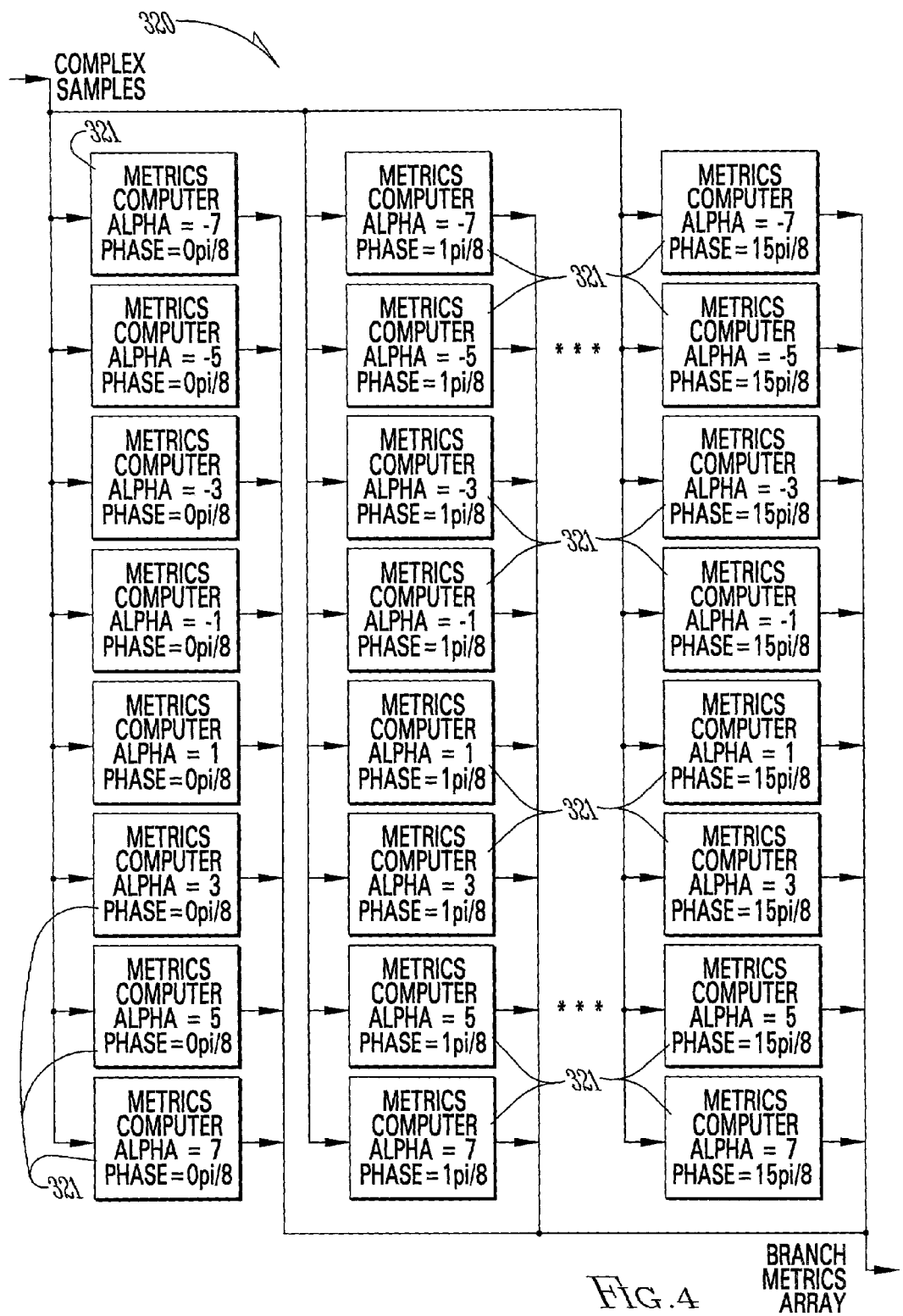
FIG. 4 is a detailed block diagram of a branch metric computer incorporated in the demodulator of FIG. 3.
Figure 5:
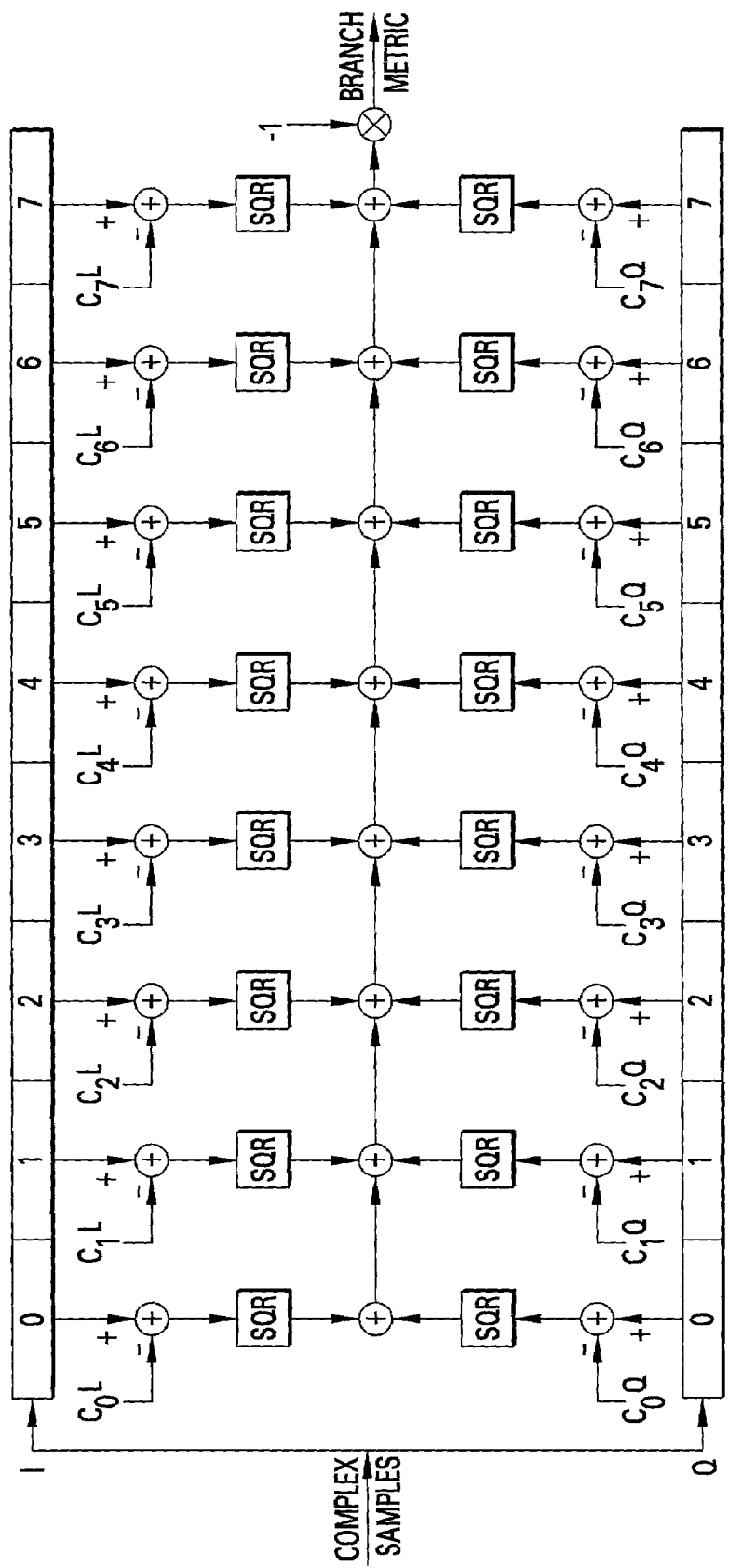
FIG. 5 is a detailed block diagram of a squared Euclidean distance computation function in the branch metric computer of FIG. 4.

FIG. 3 is a block diagram of an embodiment of a BEAM demodulator 140 of FIG. 1. Signal acquisition, carrier tracking, and time tracking are not shown in this figure in order to minimize the complexity of the block diagram. An iterative turbo decoding 301 in the BEAM demodulator 300 is very processing intensive, beyond the capability of current programmable digital signal processors. FIG. 3 illustrates a hardware implementation of the turbo decoding algorithm in an FPGA (field programmable gate array) 302. Functions in block 310 are parts of the BEAM demodulator algorithm that may be implemented in real-time software in a digital signal processor. The CPM demodulator 145 of FIG. 1 is implemented as a demodulator branch metrics computer 320 and an inner code APP module 165 along with double buffering functions in FIG. 3 as discussed in greater detail below. For each complex symbol sample set, the demodulator branch metric computer 320 generates a vector of 128 real-valued metrics. As shown in FIG. 4 there is one branch metrics computer 321 for each phase state (16 phase states with three phase states shown in FIG. 4) and each alpha or CPM level (eight levels) for each of the phase states for a total of 128. The demodulator branch metric computer 320 performs the functions of the memoryless demodulator 170 in FIG. 1. FIG. 5 is a block diagram of one of the branch metrics computer 321. Each branch metric value is computed as the square of the Euclidean distance between the actual symbol samples and the ideal samples corresponding to a particular alpha and symbol start phase. An implementation would generate only half the branch metric values for each symbol, as only the even or odd start phases are valid on alternating symbols.

Like the modulator 200 in FIG. 2, the demodulator 300 consists of operations that are performed at the symbol rate and operations that are performed at the block (3332 symbol) rate. The block-rate operations take many symbol periods to complete; therefore, double buffering between symbol-rate operations and block-rate operations is again utilized to implement the BEAM waveform. Note also that the double buffering functions may be a natural division to split the demodulator 300 between multiple digital signal processors (not shown).

Assuming path A in FIG. 3, A/B block toggle signal from a symbol count timer 305, sets switches 330, 325, and 335 to the A position. Complex input samples are stored in a symbol sample buffer 315 that stores the samples before processing. As each set of complex symbol samples is received for the next block from the symbol sample buffer 315 through switch 317 under control of the symbol count timer 305 at a count rate of modulo 3332, the branch metric computer 320 generates a vector of branch metrics and stores them in 3332 symbol branch metrics block A 340. At the same time the iterative turbo decoder 301 comprising the inner code APP CPM detector module 165, the block interleaver 150, the outer code APP convolutional decoder module 160 and the block deinterleaver 155 of FIG. 1 are decoding the current block of branch metrics from 3332 symbol branch metrics block B 345. Since the iterative turbo decoder 301 requires 40 symbols of branch metrics from the next block, it is not allowed to start until the branch metrics for those 40 symbols are collected in 3332 symbol branch metrics block A 340 and switch 337 is closed under control of the symbol count modulo 305. In effect, this means that the iterative turbo decoder 301 processing time is decreased to 3332–40 symbol periods. The iterative turbo decoder 301 executes for ten iterations under the control of an iteration count timer 350, after which a turbo decoder output log-likelihood vector is routed to a bit-decision logic operation 355 to generate a block of demodulated/decoded user data bits. The bit decision logic operation 355 converts the soft output of the iterative turbo decoder 301 to hard decisions. This is done by mapping the sign of the iterative turbo decoder 301 soft output to either 0 or 1. After every 3332 symbols, the path A/B toggles under control of the symbol count timer 305.

Figure 6:
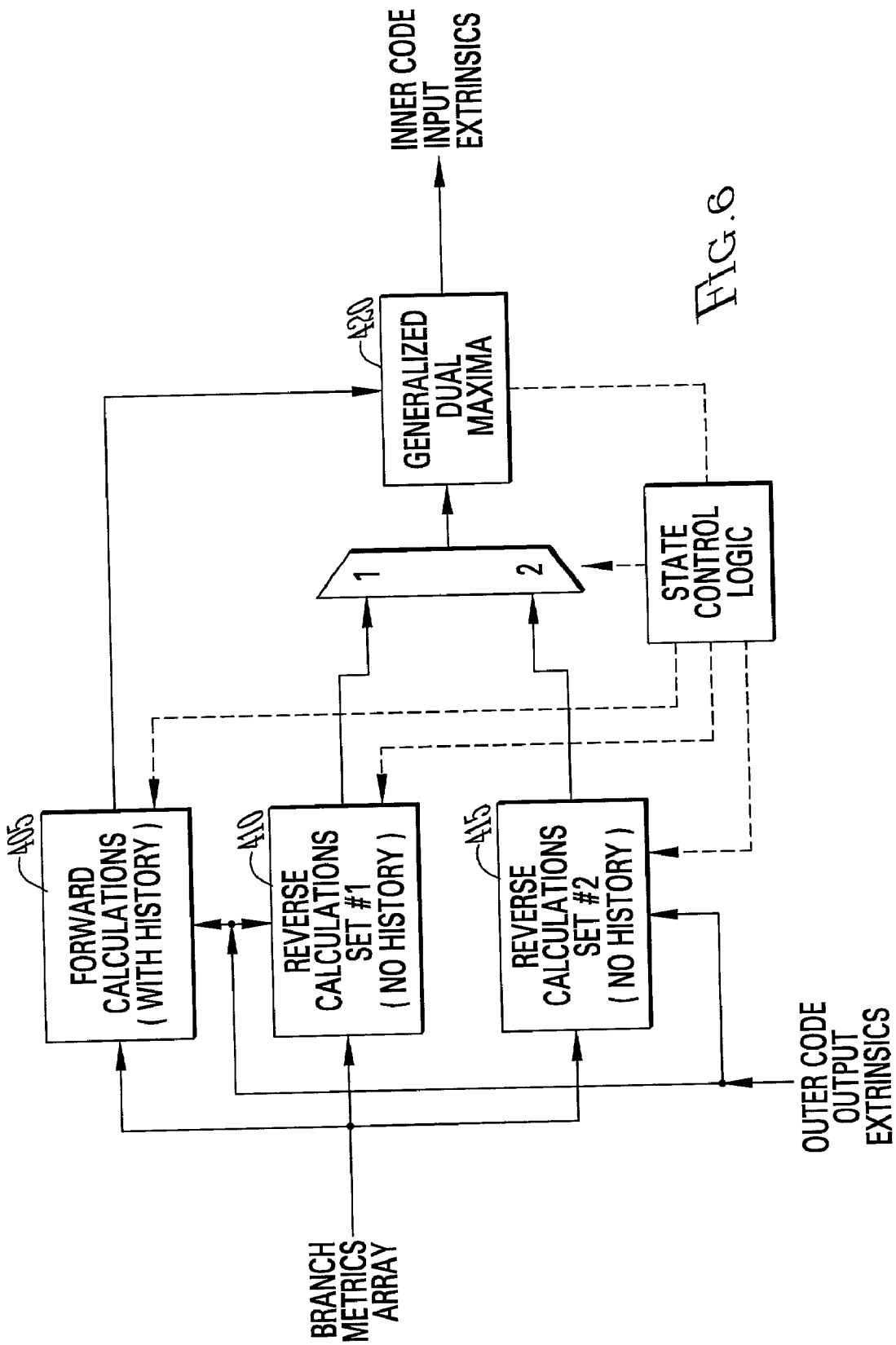
FIG. 6 is a detailed block diagram of an a posterior probability inner code decoder used in the demodulator of FIG. 3.

A block diagram of the inner code APP module 165 processing is shown in FIG. 6. The inner code APP module 165 inputs are the current block of branch metrics (one real-valued metric for each 3332 symbols 16 phase states 8 CPM levels), the next block first 40 symbols branch metrics and interleaved outer code output extrinsics (one real-valued value for each of 9996 block bits). The APP module 165 performs both forward calculations 405 and reverse path metrics calculations 410 and 415 through the trellis of all block symbols, phase states, and CPM levels. Generalized dual-maxima calculations 420 combine the outer code output extrinsics, the input branch metrics, and both the forward and backward path metrics arrays to produce an array of inner code input extrinsics (one real-valued value for each of the 9996 coded block bits).

Figure 7:
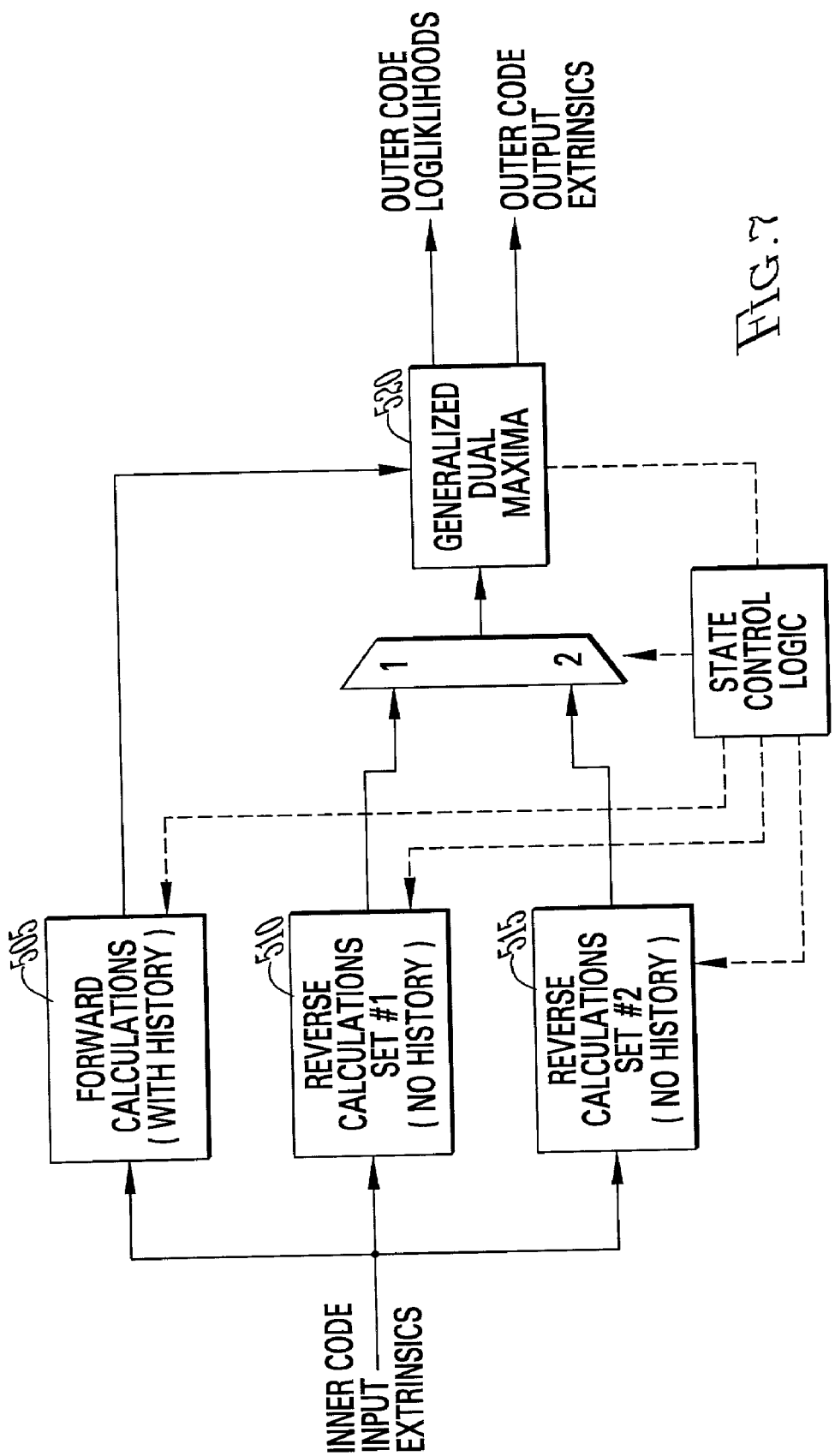
FIG. 7 is a detailed block diagram an a posterior probability outer code decoder used in the demodulator of FIG. 3.

A block diagram of the outer code APP module 160 processing is shown in FIG. 7. The outer code APP module 160 input is the deinterleaved inner code input extrinsics from the random block deinterleaver 155. The module 160 performs both forward calculations 505 and reverse path metrics calculations 510 and 515 through the trellis of all block symbols and decoder states. Generalized dual-maxima calculations 520 combine the inner code input extrinsics and both the forward and backward path metrics arrays to produce an array of outer code output extrinsics (one real-valued value for each of the 9996 coded block bits). Also produced is an array of outer code input log-likelihood values (one real-valued value for each of the 6662 user data bits), whose sign represents the demodulated/decoded user data bits.

Carrier and time tracking algorithms in the BEAM demodulator 300 must operate at the low SNR at which the BEAM demodulator is capable of operating. The tracking issue is a paradoxical problem when employing turbo coding in any form in that conventional methods of carrier and timing recovery cannot be used due to the very low SNR. The use of turbo codes, particularly when combined jointly with modulation as with BEAM allows unprecedented performance with regards to BER versus SNR.

An approach to carrier recovery and tracking in the BEAM demodulator 300 in accordance with the present invention is based on the use of decision feedback. For most modulations, decision feedback is the preferred approach because it avoids the noise amplification caused by non-linear operations such as squaring. Decision feedback carrier tracking requires that a symbol be known. When the symbol is known, this can be used to generate a perfect noiseless reference signal. The problem, for any demodulator using this technique, is where to get the symbol decisions. These decisions are typically taken as the output of an M-ary PSK (phase shift keying) slicer, in the case of a PSK demodulator, and assumed to be correct. For a pure CPM waveform, the decisions are taken out of a MLSE (maximum likelihood sequence estimator) (Viterbi decoder) at an early release point so as to not induce excessive delay into the carrier recovery feedback loop. As long as at least 90% or so of the decisions are correct, the carrier or time tracking loop will operate properly. The problem with using this technique for a joint modulation and coding waveform such as BEAM is that if the decisions are taken at the output of the turbo decoder, the 9996-bit latency inherent in the decoding process would severely affect carrier tracking loop tracking and pull-in. A method must be found to derive symbol decisions with only a few symbols of latency.

An approach to developing the carrier-tracking algorithm may be envisioned by examining the structure of the iterative turbo decoder 301 shown in FIG. 3. The inner APP decoder 165 of the iterative turbo decoder 301 delivers decisions at a very high symbol error rate and high latency. The error rate of the inner decoder 165 is not much better than 50% during the first iteration of the iterative turbo decoder 301. A carrier-tracking algorithm may be implemented by using the inner APP decoder 165 of the iterative turbo decoder 301. The traceback depth of calculations in a reverse path of inner turbo decoder 165 must be reduced to the minimum number of symbols possible to minimize latency. The output of a truncated inner APP decoder has a very high symbol error rate. If used as is the high error rate would be useless for decision feedback. A way must now be found to properly utilize the symbol decisions from this truncated inner APP decoder. The simpler Viterbi algorithm could be used to construct a simplified decoder. The reasons for not doing this will be apparent subsequently. A factor to making use of the extremely high symbol error rate decisions issuing from this truncated inner APP decoder is to know, with high confidence, which decisions are correct. If the confidence value of that symbol is low, then it is best to ignore that symbol and make no decision.

Figure 8:
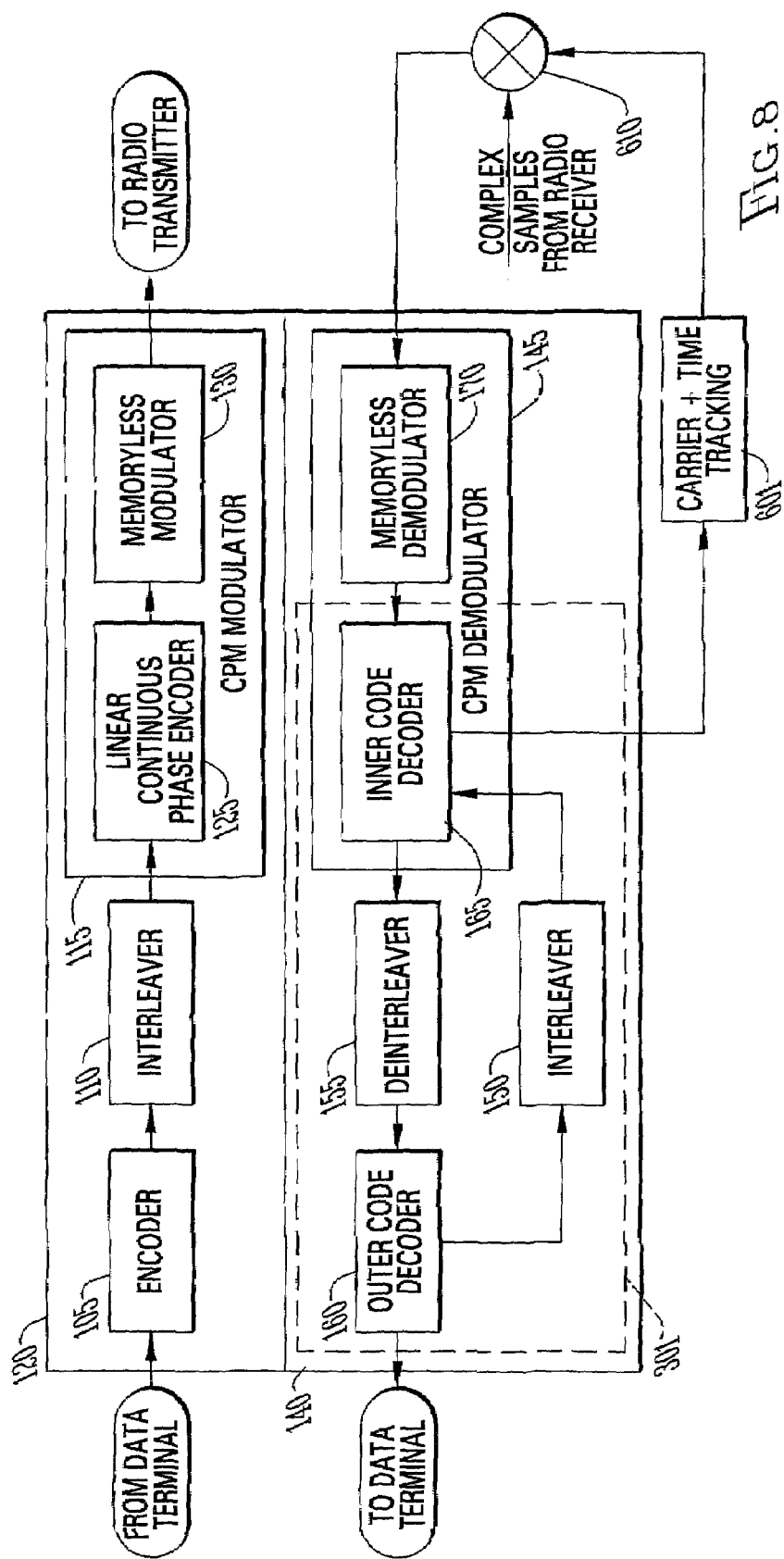
FIG. 8 is a block diagram of the present invention with the modem of FIG. 1 incorporating a carrier and time tracking algorithm.

A carrier and timing recovery algorithm may be incorporated in the modem of FIG. 1 as shown in FIG. 8. The carrier and timing recovery algorithm comprises a complex multiplier 610 that receives complex data samples containing coded information bits from the radio receiver (not shown). The output of the multiplier 610 is connected to the CPM demodulator 145 memoryless demodulator 170 that demodulates the complex data samples. The output of the memoryless demodulator 170 is connected to the inner code decoder 165 in the iterative turbo decoder 301 as before and to a carrier and time tracking loop 601 containing the algorithm functions as discussed in the following paragraphs.

Figure 9:
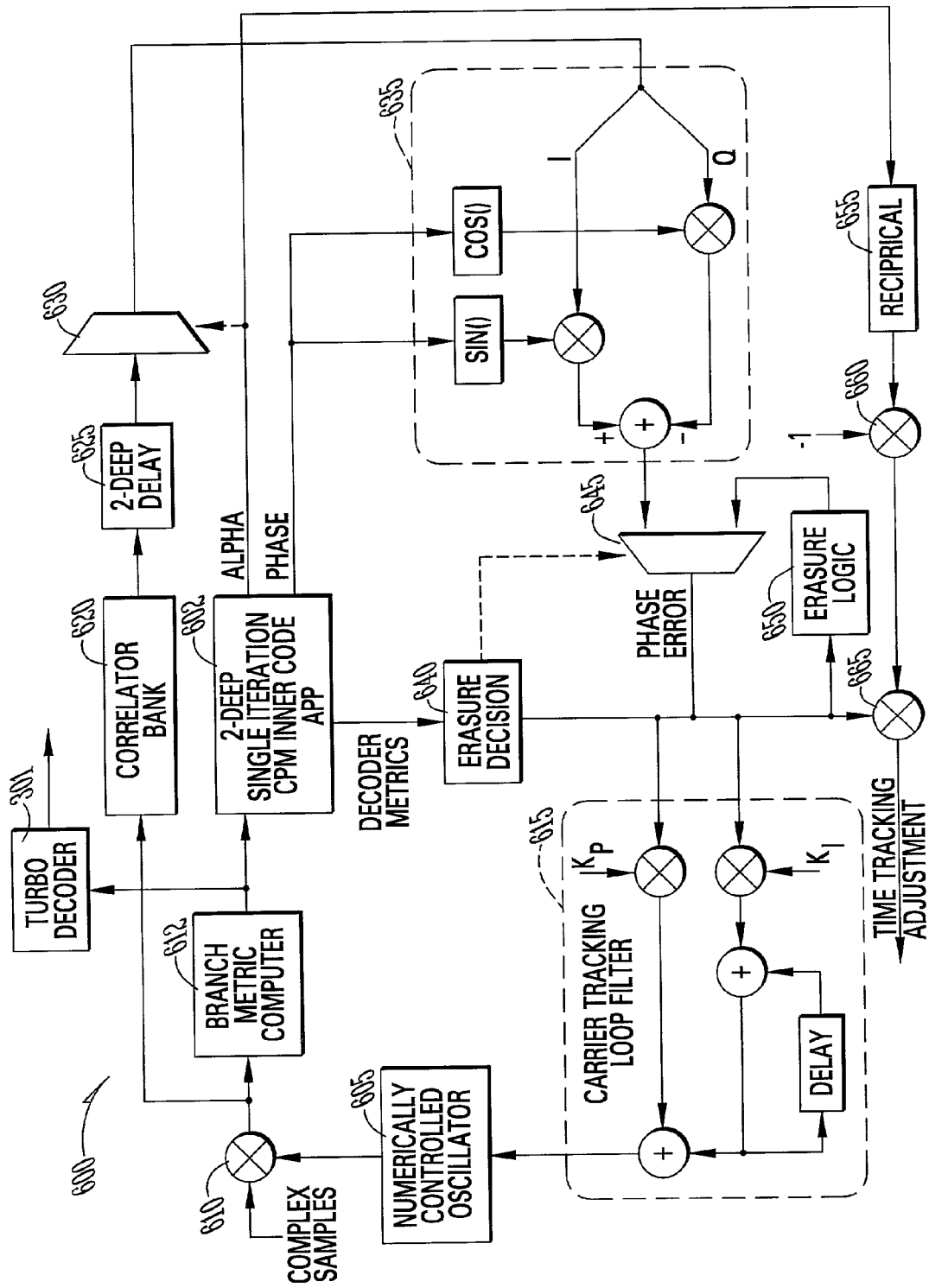
FIG. 9 is a detailed block diagram of the carrier and time tracking algorithm of FIG. 8.

The carrier and timing recovery algorithm 600 of the present invention is shown in detail in FIG. 9. The carrier and timing recovery algorithm 600 includes the multiplier 610 and the carrier and time tracking loop 601 of FIG. 8. This algorithm 600 jointly tracks the carrier and timing, thus separate tracking algorithms are not needed. The truncated APP decoder discussed above is used as a decision device 602 and supplies a stream of high symbol error rate decisions.

In FIG. 9 complex input signals that are turbo coded and CPM modulated and having a carrier are received by the complex multiplier 610. Multiplier 610 complex multiplies a numerically controlled oscillator (NCO) 605 phase signal output from the carrier and timing tracking loop 601 with the complex sampled input signal to remove the input carrier. A bank of eight correlators 620, a branch metric computer 612, the truncated APP decoder 602, and a symbol phase error estimator 635 function to produce a negative estimate of the symbol phase error. The branch metric computer 612 is the same as the branch metric computer 320 in FIG. 3 and functions as the memoryless demodulator 170 of FIG. 8. APP decoder 602 performs the decoding functions of a truncated inner APP decoder similar to the inner APP decoder 165 as previously discussed in conjunction with FIG. 3. The phase error is the difference between the APP decoder 602 output hard decision phase and one of the eight correlator noisy phase estimates. The selection of one of the eight correlators in the correlator bank 620 is based on the APP decoder 602 output hard decision alpha and output from the multiplexer 630. The eight correlators are matched filters. Each filter is matched to one of the eight alphas with a symbol start phase of 0 and an end phase of alpha*pi*h (h=modulation index) radians.

Figure 10:
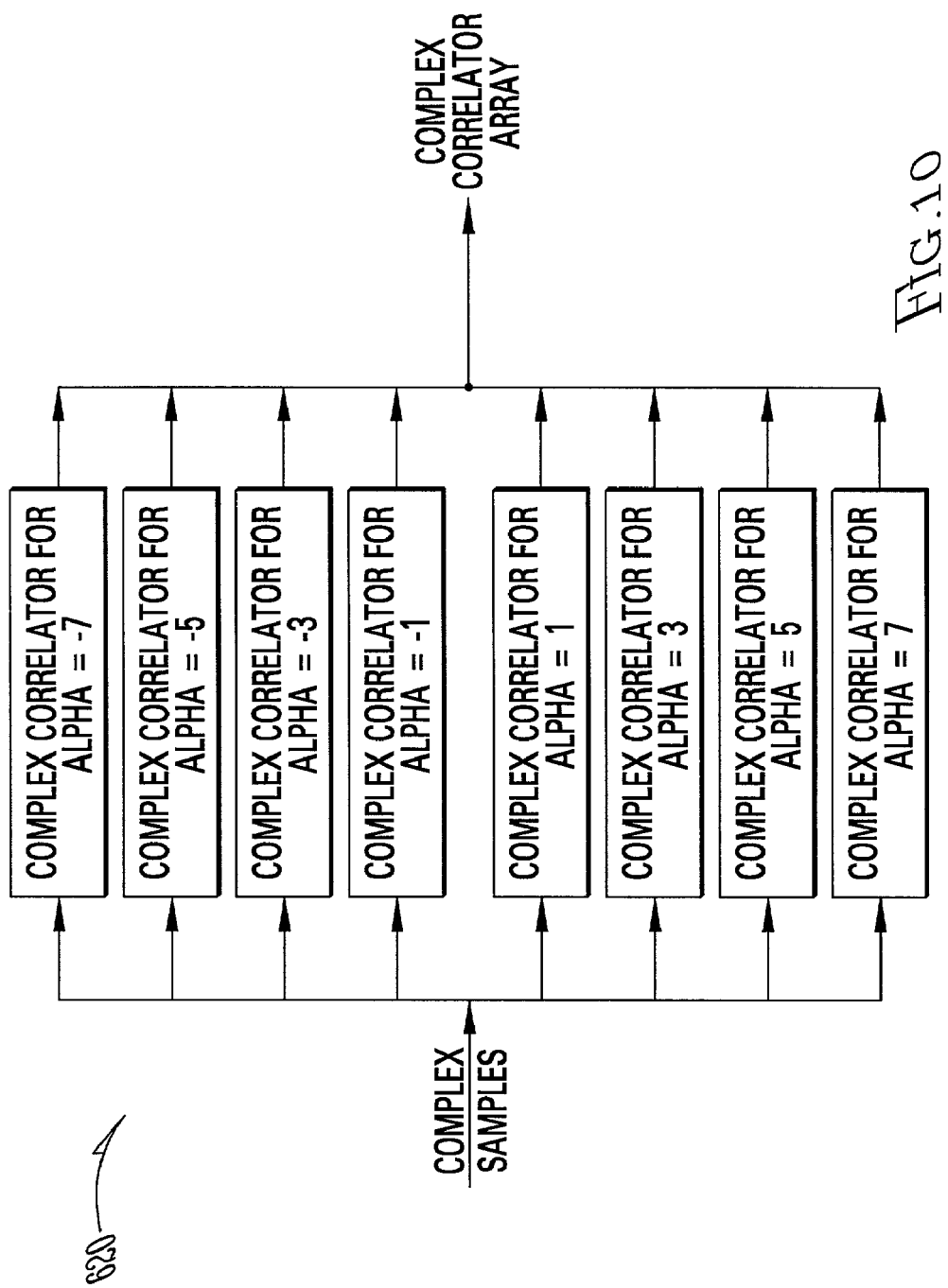
FIG. 10 is a detailed block diagram of a matched filter bank used in the carrier and time tracking algorithm of FIG. 9.
Figure 11:
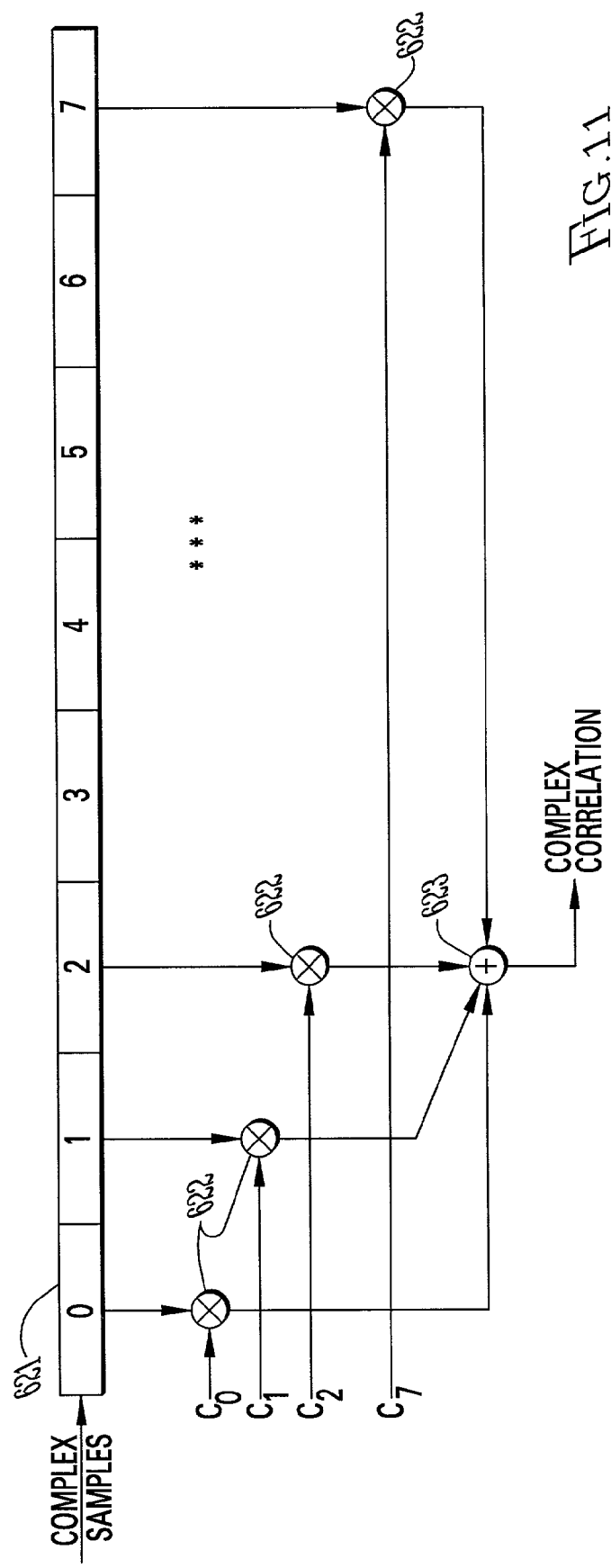
FIG. 11 is a detailed block diagram of a complex correlator used in the matched filter bank of FIG. 10.

The correlator bank 620 is shown in the block diagram of FIG. 10. In FIG. 10 each alpha value has a complex correlator. FIG. 11 shows a typical implementation of a single complex correlator. The implementation of the complex correlator is known in the art. Complex samples are loaded into a register 621, multiplied with correlator coefficients in multipliers 622, and summed in summing function 623 to give a complex correlation output. A complex multiply in the symbol phase error estimate 635 of the truncated inner APP decoder 602 output hard decision phase and the selected correlator actual symbol phase produces a negative estimate of the phase error.

A carrier-tracking (proportional+integral or PI) loop filter 615 receives the per-symbol negative phase error estimate from the symbol phase error estimator 635. This negative phase error may range from $-\pi/2$ (90 degrees phase error) to $\pi/2$ (−90 degrees phase error). The PI filter 615 provides an output frequency that equals the per-symbol scaled (KP) input phase error plus an accumulation (integration) of the scaled (KI) phase error. The value of the integrator output tends to the negative of the carrier frequency error over many symbols (the rate of convergence and the variance of the integrator output depend on the scale factor KI).

The PI loop filter 615, the NCO 605, and the multiplier 610 form a carrier tracking function. The PI loop filter 615 generates a frequency to drive the NCO 605 to close the feedback loop. Within the NCO 605, the carrier-tracking loop filter 615 output frequency, and the previous symbol final phase, is used to update a sample-by-sample phase signal multiplying the next symbol received complex samples. The loop tends towards shifting the received signal frequency and phase such that zero symbol phase error is produced. The NCO 605 may be implemented in ways known in the art.

An important part of the carrier and timing recovery algorithm 600 and the part that differentiates it from a straight CPM carrier timing/tracking algorithm is the decision device 602. The decision device 602 generates an alpha value output and a starting phase output. The alpha value is a symbol as described above for a tribit to alpha mapper 250 in conjunction with FIG. 2 for the CPM modulator and can take on one of eight values for the case of 8-ary CPM, representing the received tribit. The alpha value in FIG. 2 is from the group of alpha values −7, −5, −3, −1, 1, 3, 5, and 7. The decision device 602 starting phase or hard phase decision output for a symbol can also take on one of eight values for a modulation index h=1/8. Simulation has shown that truncating the traceback depth of the APP decoder decision device 602 to only two symbols works almost as well as a traceback depth of three or more symbols. Since low delay in the carrier tracking loop is important, a two-symbol traceback depth is used for the truncated APP decoder decision device 602 that introduces an N-symbol delay into the feedback loop.

The truncated APP decoder decision device 602 supplies a stream of decisions with high symbol error rate. The decision device 602 since it uses the APP algorithm also supplies confidence values as a decoder metrics output. A conventional Viterbi algorithm cannot be used because of the lack of a soft output. A SOVA (soft output Viterbi algorithm) may be an alternative to the APP algorithm. It is important to know, with high confidence, which decisions are good. To accomplish this the basic algorithm applies thresholds in erasure decision function 640 to both the APP decoder 602 decision confidence metrics outputs and the phase error estimate. The decision function 640 is implemented in comparators known in the art. If the confidence level exceeds some confidence threshold and the phase error is below some phase threshold then with high confidence (desirably>90%), the symbol decision and the phase error estimate are accepted as correct. If the thresholds are not met then the symbol decision and the phase error estimate is rejected. This rejection is called an erasure. The end result is one of three outcomes: 1) APP decoder 602 output decision and phase error estimate correct and accepted (no erasure), 2) APP decoder 602 output decision and phase error estimate incorrect but accepted (no erasure), and 3) erasure declared. Of the symbols not erased, the goal is to keep the incorrect decision rate below 10%.

When an erasure is declared, no phase error estimate is generated. The carrier and timing-tracking loop 615 must still operate to maintain carrier tracking. Several methods of dealing with erasures when driving the loop filter 615 may be implemented. When an erasure is present, loop filter 615 may be updated by one of the following methods: 1) drive it with zero phase error, 2) drive it with a replication of the last non-erased phase error, 3) drive it with a decaying version of the last non-erased phase error, 4) do not update the loop filter thereby freezing output tracking frequency, or 5) inject an external estimate or measurement of carrier frequency as the loop filter output.

The phase error term is generated by mixing the output of the selected matched filter correlator bank 620 with the APP decoder 602 symbol phase estimate output. Note that the APP decoder 602 symbol alpha output selects the appropriate correlator output from multiplexer 630. The mix is done using a standard sine-cosine mixer 635 know in the art that functions as a phase discriminator with an S-shaped error curve. Alternately, an arctangent discriminator (not shown) known in the art may be used in place of the sine-cosine mixer 635. The arctangent discriminator has the advantage of having a linear error curve rather an S-shaped curve. Implementing an arctangent discriminator typically requires more computations. Erasure logic 650 maintains knowledge of the last phase error driving the loop filter 615 and generates a next symbol phase error estimate. The erasure logic 650 implementation depends on the method of dealing with erasures. Five possible methods of dealing with erasures are described above. If during an erasure, the loop filter 615 is driven with zero phase error (method 1) then erasure logic 650 is implemented as a register holding the value 0. If the loop filter 615 is driven with a replication of the last non-erased phase error (method 2) then erasure logic 650 is implemented as a holding register. If loop filter 615 is driven with a decayed version of the last non-erased phase error (method 3) then erasure logic 650 is implemented as a holding register and a decay constant multiplier with feedback. If during erasures, the loop filter 615 is not updated (method 4) or its output is replaced with some external frequency source (method 5) then erasure logic 650 performs no function. For methods 4 and 5, the erasure decision 640 controls the running and/or output of the loop filter 615.

The APP decoder 602 alpha decision output, if inverted 655 and negated 660 then multiplied by the phase error in a second multiplier 665, may be used as one means of generating a timing adjustment value in the present invention. This timing value is used to shift the hardware sampling frequency so as to align the samples to the symbol boundary. This carrier tracking phase lock loop of FIG. 9 will pull in on its own, although very slowly. For rapid acquisition, it is designed to be forced into phase lock during a preamble acquisition process associated with the MIL-STD-188-181B waveform or some similar means.

It is believed that the synchronization method and apparatus for modems based on jointly iterative turbo demodulation and decoding of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A bandwidth efficient advanced modulation waveform modem comprising concatenated convolutional coding, interleaving, and continuous phase modulation and having a modulator connected to a transmitter to transmit signals having coded information bits over a communications channel and a demodulator connected to a receiver to receive the signals over the communications channel said demodulator comprising:

a multiplier for multiplying an input signal received from the receiver and having coded information bits and a carrier by a phase signal;

a memoryless demodulator connected to the multiplier for demodulating the multiplied input signal;

an iterative turbo decoder connected to the memoryless demodulator for decoding the multiplied input signal; and a carrier and time tracking loop for providing the phase signal to track the input carrier and for adjusting time tracking, wherein said carrier and time tracking loop further comprises:
- a correlator bank connected to the multiplier for providing correlator phase estimates;
- a decision device connected to the memoryless demodulator for delivering alpha values representative of data symbols and hard decision phase information at a high error rate and low latency;
- a multiplexer connected to the correlator bank and the decision device wherein an alpha value selects phase estimate from the correlator bank utilizing the multiplexer;
- a symbol phase error estimator connected to the decision device and the multiplexer for producing a symbol phase error estimate from the hard decision phase information and the selected correlator phase estimate;
- a carrier tracking loop filter connected to the symbol phase error estimator for receiving the symbol phase error estimate and providing an output frequency; and
- a numerically controlled oscillator for receiving the output frequency from the carrier tracking loop filter and providing the phase signal to the multiplier to multiply the input signal to track the input carrier.

2. The modem of claim 1 wherein the carrier and time tracking loop further comprises:
- an a posteriori probability (APP) decoder utilized as the decision device said APP decoder providing a decoder metrics output confidence level and operating with a reduced traceback depth to reduce latency;
- an erasure decision function to compare the decoder metrics output confidence level from the APP decoder to a confidence threshold and the phase error estimate from the symbol phase error estimator with a phase threshold;
- an erasure logic function that maintains knowledge of a last phase error and generates a next symbol phase error estimate; and
- a multiplexer connected to the erasure decision function and erasure logic function that passes the symbol phase error estimate when the thresholds are met and the symbol decision is accepted as correct, passes the symbol phase error estimate when the thresholds are not met but symbol decision is accepted as correct, and inhibits the symbol phase error estimate when the threshold is not exceeded and an erasure is declared.

3. The modem of claim 2 wherein the erasure logic function drives the carrier tracking loop filter with one of a zero phase error signal, a repeat of the last phase error signal, and a decayed version of the last phase error signal when the erasure is declared.

4. The modem of claim 1 wherein the correlator bank further comprises a plurality of complex correlators each of said complex correlators further comprising:
- a shift register for loading complex symbol samples from the multiplier;
- a plurality of correlator multipliers connected to the shift register outputs for comparing the complex samples to correlator coefficients; and
- a summing junction connected to the plurality of correlator multipliers for summing the comparison results to give a complex correlation output.

5. The modem of claim 1 wherein the symbol phase estimator comprises a sine-cosine mixer for producing a symbol phase error estimate from the phase estimate and the hard decision phase information.

6. The modem of claim 1 wherein the symbol phase estimator comprises an arctangent discriminator for producing a symbol phase error estimate from the phase estimate and the hard decision phase information.

7. The modem of claim 1 wherein the carrier and time tracking loop further comprises:
- an inverter connected to the decision device alpha decision output to invert the alpha value;
- a multiplier connected to the inverter to negate the inverted alpha value by multiplying by a minus one; and
- a second multiplier connected to the multiplier to multiply the inverted and negated alpha value by the symbol phase error estimate to produce a timing adjustment value.

8. The modem of claim 1 wherein the memoryless demodulator comprises a demodulator branch metric computer that further comprises a plurality of branch metrics computers for computing branch metric values for a plurality of phase states and a plurality of alpha values wherein each branch metric is computed as a square of a Euclidean distance between an actual symbol value and an ideal symbol corresponding to a phase state and alpha value.

9. The modem of claim 1 wherein the turbo decoder further comprises:
- an inner code decoder connected to the memoryless demodulator for decoding the continuous phase shift modulation to generate probabilities for decoded information bits and new probabilities for the coded information bits;
- a deinterleaver connected to the inner code decoder for reordering the decoded information bit probabilities;
- an outer code decoder connected to the deinterleaver to generate probabilities for the information bits and new probability estimates for the coded bits; and
- an interleaver connected to the outer code decoder and the inner code decoder for reordering the new probability estimates for the coded bits and delivering said probability estimates to the inner code decoder.

10. A modem using iterative turbo coding, a carrier and time tracking algorithm, and continuous phase modulation, said modem comprising:
- a multiplier for multiplying an input signal having coded information bits and a carrier by a phase signal;
- a demodulator branch metric computer connected the multiplier for demodulating the multiplied input signal;
- a correlator bank connected to the multiplexer for providing correlator phase estimates;
- an inner code a posterior probability (APP) decoder connected to the demodulator branch metrics computer for delivering alpha values representative of data symbols hard decision phase start information, and a decoder metrics output at a high error rate and low latency wherein the alpha values select a correlator phase estimate from the correlator bank;
- a symbol phase error estimator for producing a symbol phase error estimate from the correlator phase estimate and the hard decision phase information;
- a carrier tracking loop filter for receiving the symbol phase error estimate and providing an output frequency; and
- a numerically controlled oscillator for receiving the output frequency from the carrier tracking loop filter and providing the phase signal to the multiplier to multiply the input signal to track the input carrier.

11. The modem of claim 10 further comprising:
an erasure decision function to compare the decoder metrics from the APP decoder and the phase error estimate from the phase error estimator with thresholds and to provide an erasure decision;
an erasure logic function that maintains knowledge of a last phase error and generates a next symbol phase error estimate; and
a multiplexer connected to the erasure decision function and erasure logic function that passes the symbol phase error estimate when the thresholds are met and the symbol decision is accepted as correct, passes the symbol phase error estimate when the thresholds are not met but symbol decision is accepted as correct, and inhibits the symbol phase error estimate when the threshold is not exceeded and an erasure is declared.

12. The modem of claim 11 wherein the erasure logic function drives the carrier tracking loop filter with one of a zero phase error signal, a repeat of the last phase error signal, or a decayed version of the last phase error signal when the erasure is declared.

13. The modem of claim 10 wherein the symbol phase estimator comprises a sine-cosine mixer for producing a symbol phase error estimate from the phase estimate with the phase start information.

14. The modem of claim 10 wherein the symbol phase estimator comprises an arctangent discriminator for producing a symbol phase error estimate from the phase estimate with the phase start information.

15. The modem of claim 10 wherein the demodulator branch metric computer further comprises a plurality of branch metrics computers for computing branch metric values for a plurality of phase states and a plurality of alpha values wherein each branch metric is computed as a square of a Euclidean distance between an actual symbol value and an ideal symbol corresponding to a phase state and alpha value.

16. The modem of claim 10 further comprising:
an inverter connected to the decision device alpha decision output to invert the alpha value;
a multiplier connected to the inverter to negate the inverted alpha value by multiplying by a minus one; and
a second multiplier connected to the multiplier to multiply the inverted and negated alpha value by the symbol phase error estimate to produce a timing adjustment value.

17. A bandwidth efficient advanced modulation waveform modem using iterative turbo coding and continuous phase modulation said modem having a demodulator comprising a turbo decoder and a decision feedback carrier and time tracking algorithm, said modem comprising:
an a posteriori probability (APP) decoder utilized as a decision device for providing symbol decisions at a high error rate and low latency for a coded input data stream having a carrier, said APP decoder providing a decoder metrics output confidence level and operating with a reduced traceback depth to reduce latency;
a symbol phase estimator for producing a symbol phase error estimate from the symbol decisions;
an erasure decision function for deciding which symbol decisions are correct and which symbol decisions are erasures, said erasure decision function comparing the decoder metrics output confidence level from the APP decoder to a confidence threshold and the phase error estimate from the symbol phase error estimator with a phase threshold;
an erasure logic function that maintains knowledge of a last phase error and generates a next symbol phase error estimate;
a multiplexer connected to the erasure decision function and erasure logic function that passes the symbol phase error estimate when the thresholds are met and the symbol decision is accented as correct, passes the symbol phase error estimate when the thresholds are not met but symbol decision is accepted as correct, and inhibits the symbol phase error estimate when the threshold is not exceeded and an erasure is declared; and
a carrier tracking function for receiving the symbol phase error estimates when the symbol decisions are correct and receiving an erasure input when the symbol decisions are erasures to maintain carrier tracking.

18. The bandwidth efficient advanced modulation waveform modem of claim 17 further comprising:
a carrier tracking loop filter for receiving the symbol phase error estimate from the symbol phase estimator and providing an output frequency proportional to the symbol phase error estimate;
a numerically controlled oscillator for receiving the output frequency from the carrier tracking loop filter and providing a phase signal output; and
a multiplier for multiplying the coded input data stream by the phase signal to provide an output to the decision device and to maintain carrier tracking.

19. The bandwidth efficient advanced modulation waveform modem of claim 18 further comprising:
a correlator bank connected to the multiplier for providing phase estimates;
a symbol delay connected to the correlator bank to compensate for a traceback depth of the decision device; and
a multiplexer connected to the symbol delay for providing a phase estimate output from the correlator bank as selected by the alpha value output of the decision device.

20. The bandwidth efficient advanced modulation waveform modem of claim 18 further comprising a branch metrics computer connected to the multiplier for demodulating the multiplied coded input data stream.

21. The bandwidth efficient advanced modulation waveform modem of claim 17 wherein the erasure logic function drives the carrier tracking loop filter with one of a zero phase error signal, a repeat of the last phase error signal, and a decayed version of the last phase error signal when the erasure is declared.

22. A bandwidth efficient advanced modulation waveform modem using iterative turbo coding and continuous phase modulation said modem having a demodulator comprising a turbo decoder and a carrier and time tracking algorithm said carrier and time tracking algorithm performing the steps comprising:
multiplying an input signal having coded information bits and a carrier in a multiplier;
demodulating the multiplied input signal in a branch metric computer connected to the multiplier;
providing correlator phase estimates from a correlator bank connected to the multiplier;
delivering alpha values representative of date symbols, hard decision phase information, and a decoder metrics output confidence levels at a high error rate and low latency from an inner code a posteriori probability (APP) decoder connected to the branch metric computer;

selecting correlator phase estimates from the correlator bank in a multiplexer with the alpha values from the inner code APP decoder;

producing a symbol phase error estimate from the correlator phase estimate and the hard decision phase information in a symbol phase estimator;

providing an output frequency proportional to the symbol phase error estimate from a carrier tracking loop filter; and providing a phase signal from a numerically controlled oscillator to the multiplier to multiply the input signal to track the input carrier.

23. The modem of claim 22 wherein the carrier and time tracking algorithm further performs the steps comprising:

comparing the decoder metrics output confidence level from the APP decoder to a confidence threshold and the phase error estimate from the symbol phase error estimator with a phase threshold in an erasure decision function;

maintaining knowledge of a last phase error in an erasure logic function;

generating a next symbol phase error estimate in the erasure logic function;

passing the symbol phase error estimate when the confidence and phase thresholds are met and the symbol decision is accepted as correct through a multiplexer connected to the erasure decision function and erasure logic function;

passing the symbol phase error estimate when the confidence and phase thresholds are not met but symbol decision is accepted as correct through the multiplexer; and inhibiting the symbol phase error estimate when the confidence and phase threshold are not met and an erasure is declared.

* * * * *